US012167016B2

(12) United States Patent
Galpin et al.

(10) Patent No.: US 12,167,016 B2
(45) Date of Patent: Dec. 10, 2024

(54) ILLUMINATION COMPENSATION IN VIDEO CODING

(71) Applicant: InterDigital VC Holdings, Inc., Wilmington, DE (US)

(72) Inventors: Franck Galpin, Thorigne-Fouillard (FR); Ya Chen, Rennes (FR); Philippe Bordes, Laille (FR)

(73) Assignee: InterDigital VC Holdings. Inc., Wilmington, DE (US)

( * ) Notice: Subject to any disclaimer, the term of this patent is extended or adjusted under 35 U.S.C. 154(b) by 0 days.

(21) Appl. No.: 17/253,236

(22) PCT Filed: May 28, 2019

(86) PCT No.: PCT/US2019/034146
§ 371 (c)(1),
(2) Date: Dec. 17, 2020

(87) PCT Pub. No.: WO2019/245712
PCT Pub. Date: Dec. 26, 2019

(65) Prior Publication Data
US 2021/0266582 A1 Aug. 26, 2021

(30) Foreign Application Priority Data

Jun. 18, 2018 (EP) .................................... 18305750
Sep. 3, 2018 (EP) .................................... 18306160

(51) Int. Cl.
*H04N 19/513* (2014.01)
*H04N 19/172* (2014.01)
(Continued)

(52) U.S. Cl.
CPC ......... *H04N 19/513* (2014.11); *H04N 19/172* (2014.11); *H04N 19/176* (2014.11); *H04N 19/117* (2014.11)

(58) Field of Classification Search
CPC ................ H04N 19/117; H04N 19/14; H04N 19/172; H04N 19/176; H04N 19/463;
(Continued)

(56) References Cited

U.S. PATENT DOCUMENTS

| 2008/0130750 | A1* | 6/2008 | Song | H04N 19/117 375/E7.031 |
| 2010/0232507 | A1* | 9/2010 | Cho | H04N 19/157 375/E7.123 |
| 2013/0243085 | A1* | 9/2013 | Kovliga | H04N 19/597 375/240.12 |
| 2015/0023422 | A1 | 1/2015 | Zhang et al. | |

(Continued)

FOREIGN PATENT DOCUMENTS

CN 105264890 A 1/2016
CN 106031175 A 10/2016
(Continued)

OTHER PUBLICATIONS

Tamse et al, "[CE4.6.3—Inter Prediction Refinement in JVET-J0024]", Joint Video Experts Team (JVET) of ITU-T SG 16 WP 3 and ISO/IEC JTC 1/SC 29/WG 11, Document: JVET-K0118-v1, 11th Meeting: Ljubljana, Slovenia, Jul. 10, 2018, 3 pages.

(Continued)

*Primary Examiner* — Md N Haque
(74) *Attorney, Agent, or Firm* — Condo Roccia Koptiw LLP

(57) ABSTRACT

A method for decoding a current block of a picture is disclosed. First, at least one illumination compensation parameter for the current block is decoded responsive to a comparison of a parameter of the current block with a value. Then, an accessed motion compensation reference block is compensated in illumination responsive to the at least one illumination compensation parameter. Finally, the current (Continued)

block is reconstructed from the illumination and motion compensated reference block.

22 Claims, 7 Drawing Sheets

(51) Int. Cl.
*H04N 19/176* (2014.01)
*H04N 19/117* (2014.01)

(58) Field of Classification Search
CPC .... H04N 19/513; H04N 19/82; H04N 19/577; H04N 19/70
See application file for complete search history.

(56) References Cited

U.S. PATENT DOCUMENTS

| | | | |
|---|---|---|---|
| 2015/0326881 A1 | 11/2015 | Ikai et al. | |
| 2016/0029033 A1 | 1/2016 | Park et al. | |
| 2016/0150238 A1 | 5/2016 | Park et al. | |
| 2016/0295227 A1 | 10/2016 | Park et al. | |
| 2016/0366415 A1* | 12/2016 | Liu | H04N 19/463 |
| 2016/0366416 A1* | 12/2016 | Liu | G06T 7/246 |
| 2017/0006302 A1* | 1/2017 | Lee | H04N 19/513 |
| 2018/0098079 A1 | 4/2018 | Chuang et al. | |
| 2018/0098086 A1* | 4/2018 | Chuang | H04N 19/186 |
| 2018/0176592 A1 | 6/2018 | Lim et al. | |
| 2018/0184085 A1* | 6/2018 | Yang | H04N 19/115 |

FOREIGN PATENT DOCUMENTS

| | | |
|---|---|---|
| CN | 107810635 A | 3/2018 |
| WO | WO 2019070531 A1 | 4/2019 |
| WO | 2020/142331 A1 | 7/2020 |

OTHER PUBLICATIONS

Bordes et al, "Description of SDR, HDR and 360° Video Coding Technology Proposal by Qualcomm and Technicolor—Medium Complexity Version", Joint Video Experts Team (JVET) of ITU-T SG 16 WP3 and ISO/IEC JTC 1/SC 29/WG 11, Document JVET-J0022r1, 10th Meeting, San Diego, California, USA, Apr. 10, 2018, 83 pages.

Karczewicz et al, "Study of Coding Efficiency Improvements beyond HEVC", International Organization for Standardization, Coding of Moving Pictures and Audio, ISO/IEC JTC1/SC29/WG11, Document MPEG2015/M37102, Geneva, Switzerland, Oct. 2015, 13 pages.

Chen et al, "Algorithm Description of Joint Exploration Test Model 6 (JEM 6)", Joint Video Exploration Team (JVET) of ITU-T SG 16 WP 3 and ISO/IEC JTC 1/SC 29/WG 11, Document: JVET-F1001-v3, 6th Meeting Hobart, Australia, Mar. 31, 2017, 48 pages.

Chen et al, "Description of SDR, HDR and 360 Video Coding Technology Proposal by Huawei, GoPro, HiSilicon, and Samsung", Joint Video Exploration Team (JVET) of ITU-T SG 16 WP 3 and ISO/IEC JTC 1/SC 29/WG 11, Document: JVET-J0025_v2, 10th Meeting, San Diego, CA, United States, Apr. 10, 2018, 132 pages.

Anonymous, "High Efficiency Video Coding", Series H: Audiovisual and Multimedia Systems, Infrastructure of Audiovisual Services—Coding of Moving Video, Recommendation ITU-T H.265 Standard, Telecommunication Standardization Sector of ITU, Dec. 2016, pp. 1-664.

Anonymous, "Information Technology—High efficiency Coding and Media Delivery in Heterogeneous Environments—Part 2: High Efficiency Video Coding", International Organization for Standardization, ISO/IEC DIS 23008-2:201x(E), 4th Edition, Apr. 20, 2018, 874 pages.

* cited by examiner

ILLUMINATION COMPENSATION IN VIDEO CODING

CROSS REFERENCE TO RELATED APPLICATIONS

This application is the national stage entry under 35 U.S.C. § 371 of International Application PCT/US2019/034146, filed May 28, 2019 which was published in accordance with PCT Article 21(2) on Dec. 26, 2019, in English, and which claims the benefit of European Patent Application No. 18305750.4, filed Jun. 18, 2018 and European Patent Application No. 18306160.5, filed Sep. 3, 2018.

1. TECHNICAL FIELD

The present embodiments generally relate to a method and an apparatus for video encoding or decoding, and more particularly, to a method and an apparatus for video encoding or decoding using block-based Illumination Compensation (IC).

2. BACKGROUND ART

To achieve high compression efficiency, image and video coding schemes usually employ prediction and transform to leverage spatial and temporal redundancy in the video content. Generally, intra or inter prediction is used to exploit the intra or inter frame correlation, then the differences between the original image block and the predicted image block, often denoted as prediction errors or prediction residuals, are transformed, quantized and entropy coded. During encoding the original image block is usually partitioned/split into sub-blocks possibly using quad-tree partitioning. To reconstruct the video, the compressed data is decoded by inverse processes corresponding to the prediction, transform, quantization and entropy coding.

3. BRIEF SUMMARY

According to a general aspect, a method for decoding a current block of a picture is disclosed. The method comprises:
  accessing a motion compensated reference block;
  decoding at least one illumination compensation parameter for the current block responsive to a comparison of a parameter of the current block with a value;
  compensating illumination of the motion compensation reference block responsive to the at least one illumination compensation parameter; and
  reconstructing the current block from the illumination and motion compensated reference block.

According to another general aspect, an apparatus is disclosed that comprises one or more processors configured to perform:
  accessing a motion compensated reference block;
  decoding at least one illumination compensation parameter for a current block of a picture responsive to a comparison of a parameter of the current block with a value;
  compensating illumination of the motion compensation reference block responsive to the at least one illumination compensation parameter; and
  reconstructing the current block from the illumination and motion compensated reference block.

According to another general aspect, an apparatus is disclosed that comprises: means for accessing a motion compensated reference block;
  means for decoding at least one illumination compensation parameter for a current block of a picture responsive to a comparison of a parameter of the current block with a value;
  means for compensating illumination of the motion compensation reference block responsive to the at least one illumination compensation parameter; and
  means for reconstructing the current block from the illumination and motion compensated reference block.

According to another general aspect, a method for encoding a current block of a picture is disclosed. The method comprises:
  accessing a motion compensated reference block;
  encoding at least one illumination compensation parameter for the current block responsive to a comparison of a parameter of the current block with a value;
  compensating illumination of the motion compensation reference block responsive to the at least one illumination compensation parameter; and
  encoding the current block from the illumination and motion compensated reference block.

According to another general aspect, an apparatus is disclosed that comprises one or more processors configured to perform:
  accessing a motion compensated reference block;
  encoding at least one illumination compensation parameter for a current block of a picture responsive to a comparison of a parameter of the current block with a value;
  compensating illumination of the motion compensation reference block responsive to the at least one illumination compensation parameter; and
  encoding the current block from the illumination and motion compensated reference block.

According to another general aspect, an apparatus is disclosed that comprises: means for accessing a motion compensated reference block;
  means for encoding at least one illumination compensation parameter for a current block of a picture responsive to a comparison of a parameter of the current block with a value;
  means for compensating illumination of the motion compensation reference block responsive to the at least one illumination compensation parameter; and
  means for encoding the current block from the illumination and motion compensated reference block.

One or more of the present embodiments also provide a computer readable storage medium having stored thereon instructions for encoding or decoding video data according to at least part of any of the methods described above. One or more embodiments also provide a computer readable storage medium having stored thereon a bitstream generated according to the encoding methods described above. One or more embodiments also provide a method and apparatus for transmitting or receiving the bitstream generated according to the encoding methods described above. One or more embodiments also provide a computer program product including instructions for performing at least part of any of the methods described above.

4. BRIEF SUMMARY OF THE DRAWINGS

5. DETAILED DESCRIPTION

In Inter mode, IC allows correcting block prediction samples obtained via Motion Compensation (MC) by considering the spatial or temporal local illumination variation.

The IC parameters can be estimated using the reconstructed neighboring samples or using the samples of the two reference blocks for bi-prediction. Traditionally, a flag is encoded per Coding Unit (CU) in the bitstream to indicate whether the current CU use IC or not. This flag can be inferred from neighboring CU(s) in merge mode for example.

At least one embodiment proposes not to encode this flag depending on some conditions signaled in the sequence, picture or slice header.

In Inter mode, IC allows correcting block prediction samples obtained via Motion Compensation (MC) by considering the spatial or temporal local illumination variation. In general, IC modifies the MC reference samples $x_i$ using a simple linear model (Equation 1), where ($a_i$, $sh_i$, $b_i$) are the IC parameters for the reference-i block (i=0 or 1 typically for a codec enabling uni-directional or bi-prediction) associated with the current block:

$$Pred_i = (a_i * x_i >> sh_i) + b_i \quad (1)$$

Several methods can be used to derive the IC parameters such as the three methods disclosed below.

Figure 1:
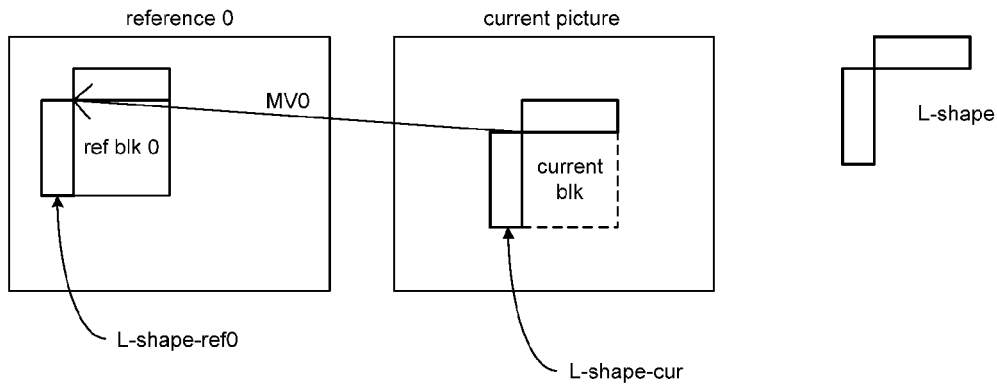
FIG. 1 illustrates Illumination Compensation parameter derivation by comparing L-shapes in reference pictures with current block's L-shape.

In a first method, the IC parameters can be estimated by comparing a set S of reconstructed neighboring samples (L-shape-cur) with a corresponding set of neighboring samples (L-shape-ref-i) of the reference-i block (i=0 or 1) as depicted in FIG. 1. The IC parameters are obtained by minimizing a difference (least squares method) between the samples in the L-shape-cur and the samples in the L-shape-ref-i corrected with IC parameters (Equation 2). Typically, the parameters a and b are derived by resolving a least square minimization on the L-shapes at the encoder (and at the decoder):

$$(a_i, b_i) = \underset{(a,b)}{\operatorname{argmin}}\left(\sum_{\substack{x \in L\text{-}shape\text{-}cur, \\ y \in L\text{-}shape\text{-}ref-i}} (x - a \cdot y - b)^2\right) \quad (2)$$

The value of the shift (sh) is determined with the desired numerical precision of (a) since (a,b) are integer.

Figure 2:
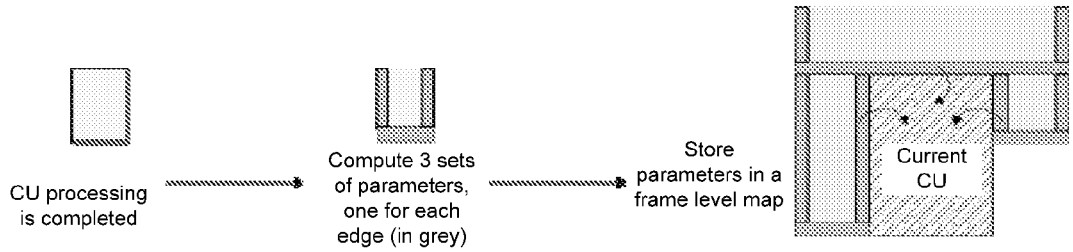
FIG. 2 illustrates Illumination Compensation parameter derivation by comparing the set of reconstructed neighboring samples (L-shape-cur) with the prediction samples used to reconstruct these neighboring samples.

In a second method, the IC parameters can be estimated by comparing the set S of reconstructed neighboring samples (L-shape-cur) with the prediction samples used to reconstruct these neighboring samples. Several IC parameters are computed during the CU reconstruction process and stored in a map to be used later by the neighboring CUs if IC is applied (FIG. 2). Since multiple neighbors may be available, pruning is performed to consider only inter neighbors and give higher priority to neighbor which use same reference frames for prediction as the current CU.

Figure 3:
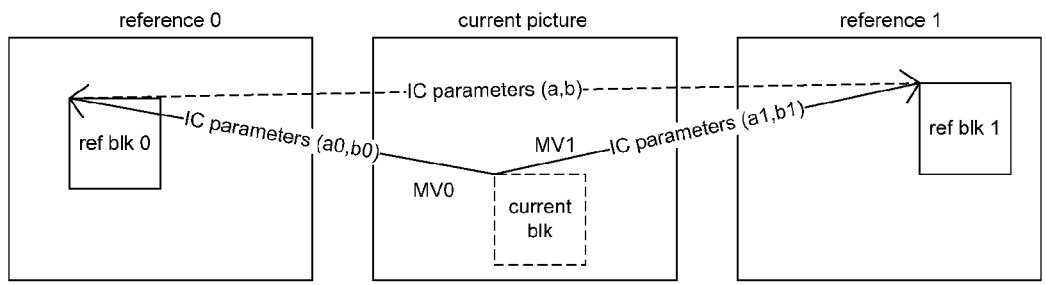
FIG. 3 illustrates Illumination Compensation parameter derivation in case of bi-prediction by comparing L-shapes of reference pictures.

In a third method, the derivation of the IC parameters in case of bi-prediction can be based on the samples ($x_0$, $x_1$) of two motion compensated blocks ref-0 and ref-1 instead of on the reconstructed samples neighbors. This can be done in two steps. First an IC temporal model of the Illumination Change between ref-1 (time-1/poc-1) and ref-0 (time-0/poc-0) are determined. Poc stands for "Picture Order Count". This can be done by computing the IC parameters (a,b) between ref-1 and ref-0 as in method 1 for instance, except that the set S of samples used are not the L-shape-ref0 and L-shape-cur but the entire block ref-1 and block ref-0. Next, the IC parameters (a0, b0) which compensate Illumination between block ref-0 and the current block, and the IC parameters (a1,b1) which compensate Illumination between block ref-1 and the current block, are both derived from this IC temporal model (FIG. 3).

In a fourth method, the derivation of the IC parameters in case of bi-prediction is made using classical rate-distortion optimization (RDO), the possible values for (a) being selected from a pre-determined table of weights and offsets. The index of the weight (GBi) being encoded at CU level. In a variant, the offset (b) is always zero. An example of pre-determined values for (a) and (sh) is given in Table 1. This technique is also known as "generalized bi-prediction" (GBP) and the IC_Enable_Flag and IC_flag are GBP_Enable_Flag and GBP_flag.

TABLE 1 example of pre-determined values for (a)

| weight value | w | shift |
|---|---|---|
| −1/4 | −1 | 2 |
| 1/4 | 1 | 2 |
| 3/8 | 3 | 3 |
| 1/2 | 1 | 1 |
| 5/8 | 5 | 3 |
| 3/4 | 3 | 2 |
| 5/4 | 5 | 2 |

At least one embodiment limits coding cost increase when IC is enabled. This can be indicated in the sequence and/or picture/slice header by a flag, e.g. IC_Enable_Flag. When IC is enabled (IC_Enable_Flag is true or equal to 1), a IC flag (e.g. IC_flag) is encoded in the bitstream per CU to indicate whether IC applies for the current CU or not. As an example, in the case where IC_flag is equal to true or to 1, then IC applies for the current CU. Otherwise (IC_flag is equal to false or to 0), then IC does not apply for the current CU. This increases the coding cost consequently.

At least one embodiment limits coding cost increase in the case where Illumination Change in the sequence is merely limited to few pictures, e.g. because of flashes. Indeed, the IC can be efficient when these pictures are used as references in the reconstruction process but less (or not) efficient if there is no Illumination Change in the pictures.

To reduce the coding cost of the IC flag, one bit (or flag) can signal in a sequence or slice header whether IC is enabled for the current slice or the current picture. However, if the current picture uses several reference pictures and only one of these reference pictures has an illumination change compared to the current picture, then the coding of the IC flag is counterproductive. Indeed, a IC flag needs to be coded for a CU that is unidirectionally predicted using the other reference pictures that have no illumination change compared to the current picture. In this latter case, the coding cost increases unnecessarily since the coded IC flag is almost always false. Conversely, if the slice header indicates IC is disabled, this will reduce the coding efficiency for CUs using the reference picture with illumination change.

Some conditions to the presence of the IC flag can be added. For example, the IC flag is not coded in case of Merge mode but inherited from the neighboring CU. These conditions can also depend on the size of the current CU and the coding mode used by neighbors. These conditions can apply for the entire sequence and all the slices.

At least one first embodiment proposes to signal in the sequence, picture or slice header some conditions to the presence of the IC flag at the CU level in the bitstream. The conditions may change per slice (e.g. slice header), per picture (e.g. a picture header), group of pictures (e.g. Picture Parameter Set—PPS) or per sequence (e.g. a sequence header or a Sequence Parameter Set—SPS).

In at least one second embodiment, the conditions may be related to the reference pictures used for inter-prediction. In at least one second embodiment, the presence and/or application of the IC flag is depending on another CU parameter such as: the component (e.g. IC enabled for Luma only, and disabled for chroma), the reference index(es) values, the CU size, the CU depth (also named coding tree depth), picture hierarchical depth or picture temporal indicator (e.g. "nuh_temporal_id_plus1" in HEVC), also known as temporal id. A coding unit of a picture of hierarchical picture depth D is coded with mode "inter", its prediction can be built with reference samples from reconstructed pictures with hierarchical picture depth DR with DR<D only. For example, the hierarchical picture depth can be the temporal id of the picture.

The first and second embodiments may be combined or applied separately. Applying the second embodiment without the first embodiment can be implicitly or explicitly signaled in the bitstream (e.g. in a sequence, picture or slice header).

Figure 4A:
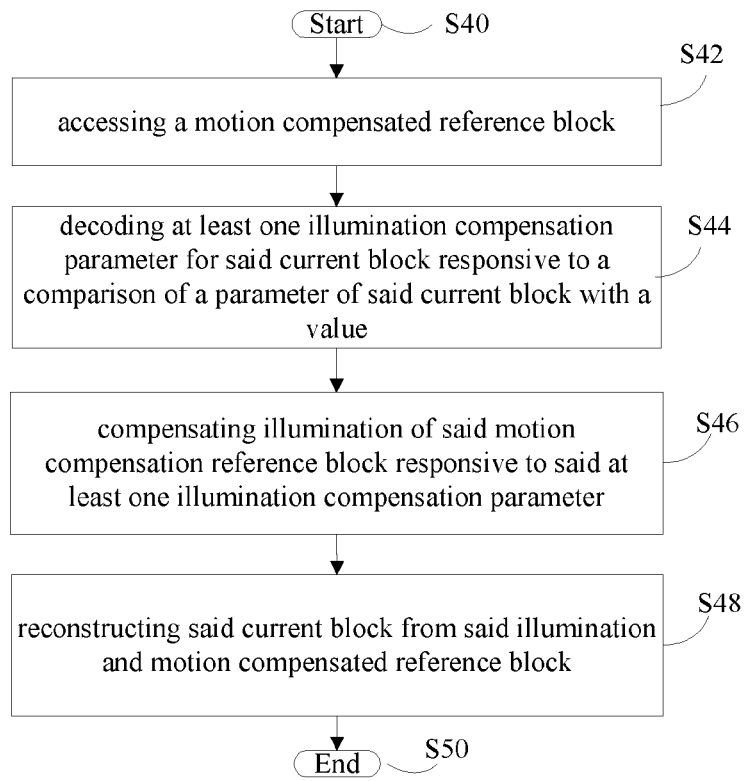
FIG. 4A depicts a flowchart of a decoding method according to one embodiment.

FIG. 4A depicts a flowchart of a decoding method according to one embodiment.

The method starts at step S40. A decoding apparatus, i.e. the one depicted on FIG. 9, accesses a motion compensated reference block (S42). The decoding apparatus decodes (S44), from a bitstream, at least one illumination compensation parameter, e.g. IC_Flag, for a current block to be decoded. The at least one illumination compensation parameter is decoded depending on one or more conditions. Several embodiments are disclosed with respect to FIGS. 5A, 5B, 6A and 6B.

In an embodiment, the at least one illumination compensation parameter is decoded responsive to a comparison of a parameter, e.g. the size of the CU, of said current block with a value. In an embodiment, the at least one illumination compensation parameter is decoded only in the case where a parameter of said current block verifies a condition, e.g. it is higher, equal or lower than a given value.

The motion compensation reference block is (S46) possibly compensated in illumination responsive to the at least one illumination compensation parameter. In one embodiment, in the case where IC_Flag is true then the motion compensation reference block is compensated in illumination. Otherwise (IC_Flag is false), the motion compensation reference block is not compensated in illumination.

The current block is reconstructed (S48) from the motion compensated reference block possibly also compensated in illumination. To this aim, a residual block is decoded from the bitstream and added (after inverse quantization and inverse transform) to the motion and illumination compensated block.

The method ends at 550.

Figure 4B:
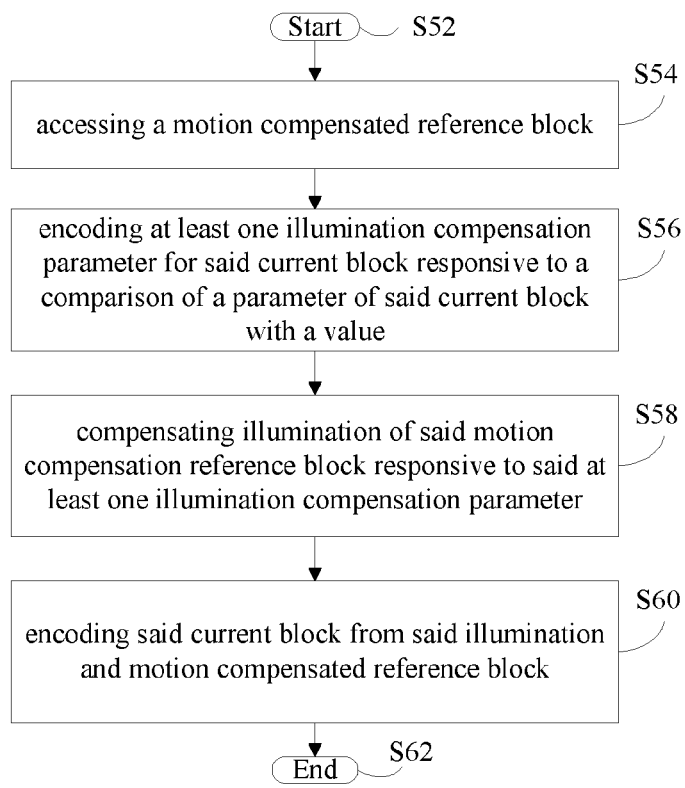
FIG. 4B depicts a flowchart of an encoding method according to one embodiment.

FIG. 4B depicts a flowchart of an encoding method according to one embodiment.

The method starts at step S52. An encoding apparatus, i.e. the one depicted on FIG. 8, accesses a motion compensated reference block (S54).

The encoding apparatus encodes (S56), in a bitstream, at least one illumination compensation parameter, e.g. IC_Flag, for a current block to be encoded. The at least one illumination compensation parameter is encoded depending on one or more conditions. Several embodiments are disclosed with respect to FIGS. 5A, 5B, 6A and 6B.

In an embodiment, the at least one illumination compensation parameter is encoded responsive to a comparison of a parameter, e.g. the size of the CU, of said current block with a value. In an embodiment, the at least one illumination compensation parameter is encoded only in the case where a parameter, e.g. the size of the CU, of said current block verifies a condition, e.g. the CU size is higher, equal or lower than a given value.

The motion compensation reference block is (S58) possibly compensated in illumination responsive to the at least one illumination compensation parameter. In one embodiment, in the case where IC_Flag is true then the motion compensation reference block is compensated in illumination. Otherwise (IC_Flag is false), the motion compensation reference block is not compensated in illumination.

The current block is encoded (S60) from the motion compensated reference block possibly also compensated in illumination. To this aim, a residual block is obtained by subtracting the motion and illumination compensated block from the current block. The residual block is quantized and transformed before being entropy coded in the bitstream.

The method ends at S62.

In one embodiment that applies on both the encoder and on the decoder sides, the condition is related to the reference pictures used for inter-prediction. In the slice header (600 of FIG. 5A), a set of flags indicate the set of reference indexes (ref_idx) that can be used for CU coded with IC enabled (IC flag set to true). A mode is decoded for a current CU (610).

For example, if the current slice has two reference pictures in list-0 (L0) and two reference pictures in list-1 (L1), then 4 flags are coded (flag_Li_Rj) in the slice header, one for each reference (see Table 2):

TABLE 2 example where 4 flags "flag_Li_Rj" are coded.

| L0 | | L1 | |
|---|---|---|---|
| ref_idx = 0 | ref_idx = 1 | ref_idx = 0 | ref_idx = 1 |
| flag_L0_R0 | flag_L0_R1 | flag_1_R0 | flag_L1_R1 |

"flag_Li_Rj=1" indicates that at least one CU in inter mode, using ref_idx=Rj for the list Li has a coded IC_flag equal to 1. When ref_idx=Rj for the list Li, then the IC_flag is coded (650,660).

"flag_Li_Rj=0" indicates that there is no CU in inter mode, using ref_idx=Rj for the list Li with a IC_flag coded value equal to 1. Consequently, if one CU uses ref_idx=Rj for the list Li (630), then IC_flag is not coded, i.e. not present in the bitstream (640), and the value of IC_flag is inferred to be zero (see 660 in FIG. 5A).

In a variant, no flag "flag_Li_Rj" is coded. In this case, an IC_flag is present in the bitstream only in the case where the reference picture index (either in L0 or L1) is the first of the list, i.e. ref_idx=0.

The method loops over the CUs in the slice.

In a variant, the values of "flag_Li_Rj" condition all the CU coded in inter mode (620), except in merge and/or skip modes. For example, if a CU is coded in merge mode and ref_idx=Rj for list Li and flag_Li_Rj=0, a IC_flag is still coded.

In another variant, the values of "flag_Li_Rj" conditions all the CU coded in bi-prediction only. In a variant, the 4 flags which are coded (flag_Ri_Rj) in the slice header, corresponds to a combination of ref_idx values (see Table 3):

TABLE 3 example where 4 flags "flag_Ri_Rj" are coded.

| L0 | | | |
|---|---|---|---|
| ref_idx = 0 | ref_idx = 0 | ref_idx = 1 | ref_idx = 1 |
| L1 | | | |
| ref_idx = 0 | ref_idx = 1 | ref_idx = 0 | ref_idx = 1 |
| flag_R0_R0 | flag_R0_R1 | flag_R1_R0 | flag_R1_R1 |

"flag_Ri_Rj=1" indicates that at least one CU in inter mode, using ref_idx=Ri for the list 0 and ref_idx=Rj for the list 1 has coded IC_flag equal to 1. When ref_idx=Ri for the list 0 and ref_idx=Rj for the list 1, then the IC_flag is coded (650,660).

"flag_Ri_Rj=0" indicates that there is no CU in inter mode using ref_idx=Ri for the list 0 and ref_idx=Rj for the list 1 and with coded IC_flag equal to 1. Consequently, if one CU has ref_idx=Ri for the list 0 and ref_idx=Rj for the list 1 (630), then IC_flag is not coded (640) and the value of IC_flag is inferred to be zero (see 660 in FIG. 5A).

This embodiment applies when ref_idx[0] and ref_idx[1] are coded before IC_flag as in JVET reference software (JEM).

In a variant, IC_flag is always zero if at least one of ref_idx[0] and ref_idx[1] is non-zero. In this case, if IC_flag is parsed before the ref_idx[0] and ref_idx[1] and if IC_flag is true, then ref_idx[0] and ref_idx[1] are not coded and are inferred to be both zero.

In another variant, the syntax elements ref_idx[0] and ref_idx[1] are coded first, but when at least one of ref_idx[0] and ref_idx[1] is non-zero, then IC_flag can be not coded and inferred to be equal to zero.

Figure 5A:
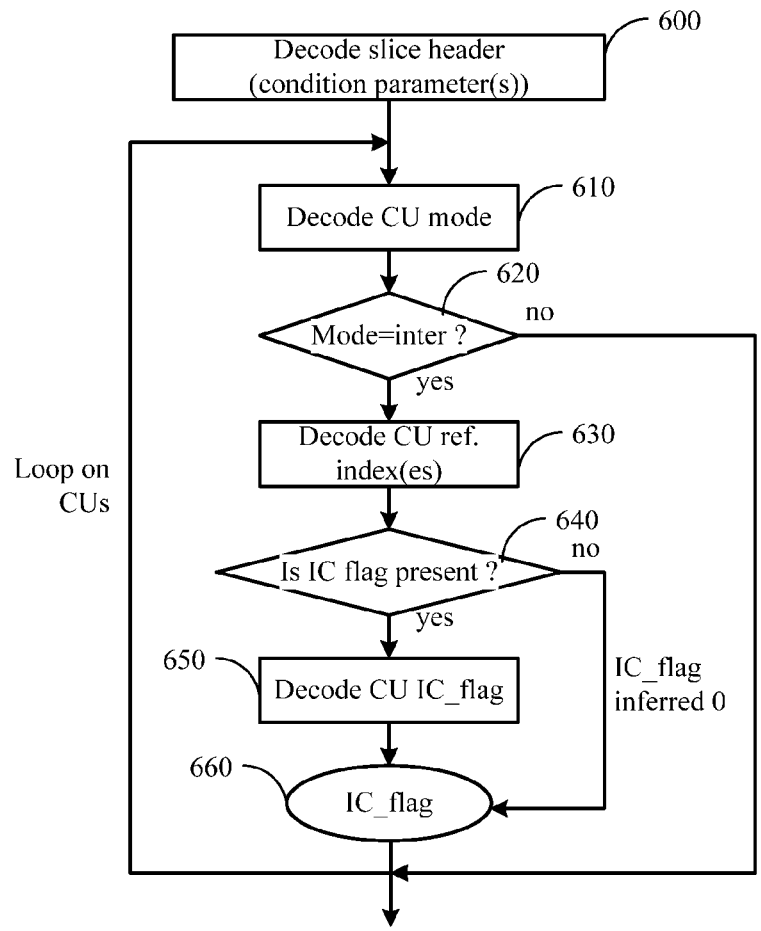
FIGS. 5A and 5B depict flowcharts of a part of the decoding method according to different embodiments.
Figure 5B:
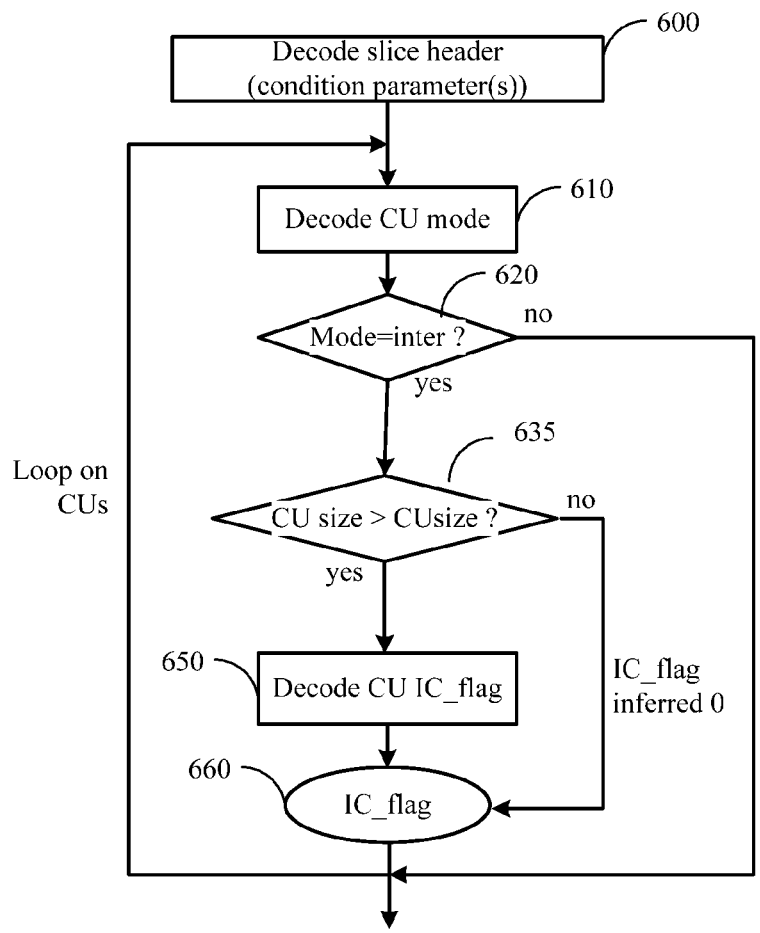

In another embodiment, the condition is related to the CU size. In the slice or picture (e.g. PPS) header, one or several values representative of a minimum (or a maximum) CU size (e.g. width, height, width and height, width/CTU size, log 2(width), etc. . . . ) is coded and is further used during the parsing of the CU parameters to determine whether the IC_flag is present or not for the current CU (see FIG. 5B). On FIG. 5B, the module identical to the modules of FIG. 5A are identified with the same numerical references.

For example, if the condition is CUsize=16, then the IC_flag is coded in the bitstream, i.e. is present in the bitstream (635), only in the case where the CU size is superior (or inferior) to CUsize. Otherwise, IC_flag is inferred to be equal to zero. The CU size is considered to be larger than CUsize when CU's width and/or CU's height are larger than CUsize. In a variant, the CU size of a block can be equal to MIN(cuWidth, cuHeight) or to MAX(cuWidth, cuHeight). CUsize can be coded in SPS, PPS or slice header.

Indeed, the benefit of IC is higher for CUs of larger size. Bits are saved by not coding IC_flag for CUs of small size. Additionally, in case of hierarchical coding (FIG. 6A), the B slices of lower hierarchy (high value of hierarchical picture depth or temporal id) are coded with very few bits compared to slices of higher hierarchy (low value of hierarchical picture depth or temporal id) in general. For example, on FIG. 6A, the B slices of picture 3 are coded in general with less bits than B-slices of picture 4. Therefore, coding efficiency can be improved by conditioning the presence of the IC_flag for a CU to the picture hierarchical depth of the slice which the CU belongs to or by adapting the condition on the CU size to the picture hierarchical depth for example.

To this aim, in one embodiment, the IC_flag is present in the bitstream (i.e. coded and decoded) for CU belonging to pictures whose picture hierarchical depth is inferior to a defined value. This defined value may be coded in the bitstream, e.g. in the sequence header (SPS) or picture header (PPS).

In a variant, when the hierarchical depth (FIG. 6A) of a picture is smaller than a value (e.g. a defined threshold), then IC is enabled in the current slice belonging to this picture (e.g. IC_Enable_Flag is true) and the IC_flag is present at CU level.

In another variant, when the hierarchical depth (FIG. 6A) of a picture is larger than a value (e.g. a defined threshold), then IC is enabled in the current slice belonging to this picture (e.g. IC_Enable_Flag is true) and the IC_flag is present in the bitstream at CU level in the case where the CU size is larger than CUsize.

In another variant, when IC_Enable_Flag is true, the value of "CUsize" is a function of hierarchical picture depth s3 (e.g., CUsize=16 if s3<3 and CUsize=32 if s3>=3). When the hierarchical depth (FIG. 6A) of a picture is larger (or smaller) than a value T (e.g. a defined threshold), then IC is enabled in the current slice belonging to this picture (e.g. IC_Enable_Flag inferred to true) and the IC_flag is present in the bitstream at CU level in the case where the CU size is larger than CUsize(T). As an example, CUsize(T) is an increasing function of T. The value of T can be coded in the SPS or in the PPS.

Figure 6A:
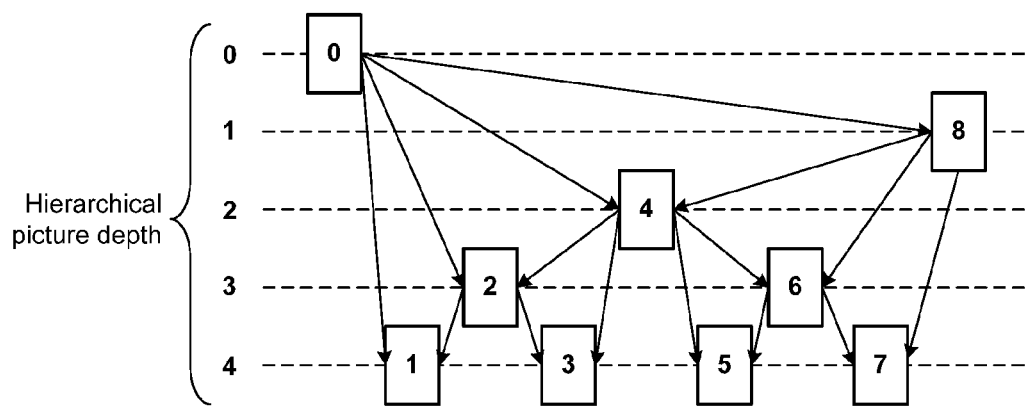
FIG. 6A is a pictorial example illustrating hierarchical picture depth.
Figure 6B:
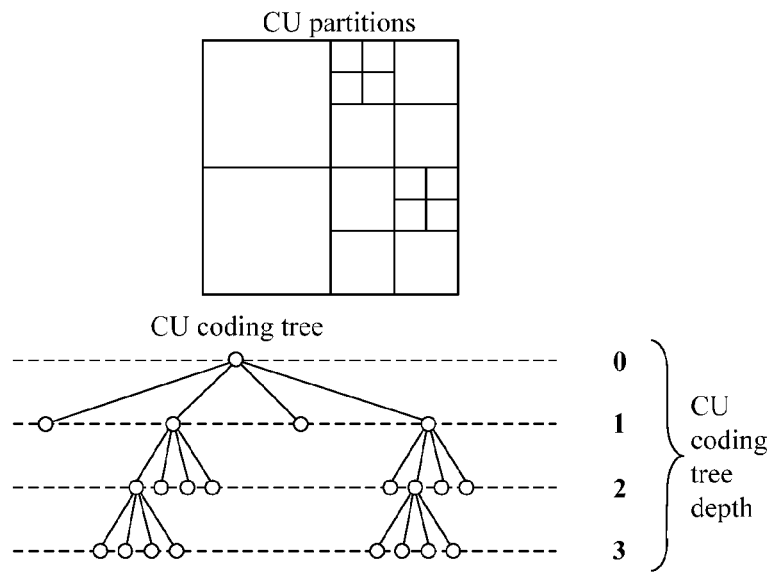
FIG. 6B is a pictorial example illustrating coding tree depth.

In another embodiment, when a current CU has a coding tree depth larger than a value S, then the IC_flag is not coded but inferred to zero. S can be coded in the SPS, PPS or slice header. The coding tree depth (also named CU depth) refers to the depth of the coding unit in the coding tree it belongs to as illustrated by FIG. 6B.

In the following, we call the "CU depth" the number of split until the current CU leaf is reached.

All embodiments disclosed with respect to FIGS. 5A, 5B, 6A and 6B applies to both encoding and decoding side.

Figure 7:
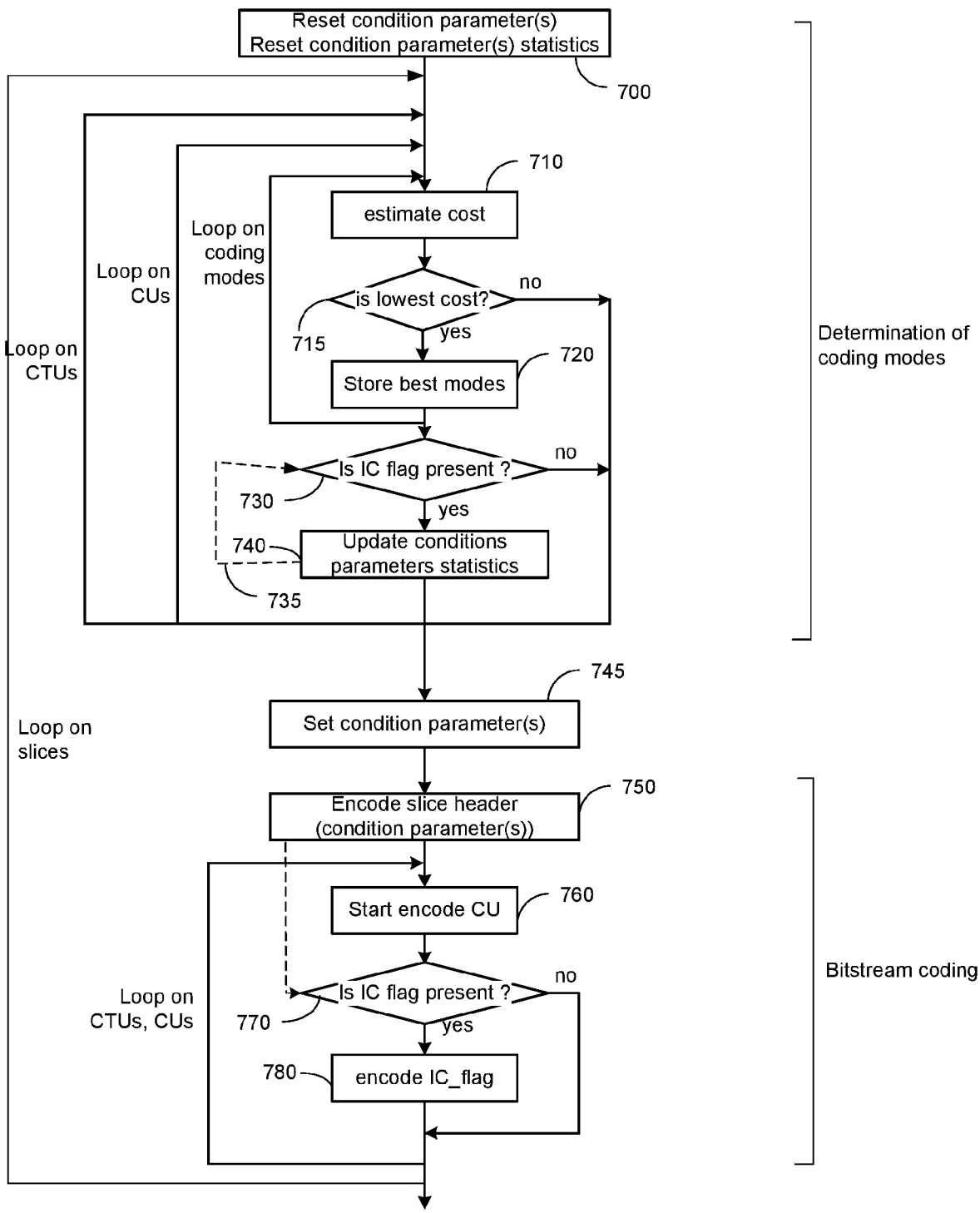
FIG. 7 depicts a flowchart of a method for coding mode determination and encoding according to one embodiment.

In another embodiment that applies on the encoder side, the determination of the conditions parameters is depicted in FIG. 7. Traditionally, an encoder process can be divided in two main stages:

1) Determination of the coding modes for all the CUs (see 710, 720):
   Each coding mode is evaluated by computing the coding cost (710). Typically, the coding cost is a function of the distortion and the number of bits used to code the CU, such as a Lagrangian for example. The coding mode with lower coding cost (715) is finally selected (720) and will be next used to encode the current CU (760).

2) Entropy coding and building of the bitstreams (see 750, 760, 780):
   The condition parameters are up-dated in (745) and encoded in the bit-streams (750). For each CU, the coding parameters including the coding mode selected in (720) are coded in the bitstream (760). If the condition parameters indicate the IC_flag is present, the value of IC_flag is coded (780).

These two stages can be implemented sequentially (stage 1 for all the CUs in the slice/picture and next stage 2 for or all the CUs in the slice/picture) or nested together (stage 1 and stage 2 nested for each CU). In all cases (nested or not) the statistics of previous slices/pictures are cumulated and made available for the current slice/picture. First (700), the condition parameters are reset to default values, i.e. there is no restriction on IC_flag coding conditions. For example, this corresponds to set all the flags in Table 2 or Table 3 equal to 1.

In the first stage (determination of coding modes), the statistics of the condition parameters are collected. For example, in bi-prediction, the number of CUs with IC_flag equal to 1 and with both ref_idx[L0] and ref_idx[L1] equal to 0 is counted (count_00) (see Table 4).

TABLE 4 example where bi-prediction reference indexes are counted (statistics).

| L0 | | | |
|---|---|---|---|
| ref_idx = 0 | ref_idx = 0 | ref_idx = 1 | ref_idx = 1 |
| L1 | | | |
| ref_idx = 0 | ref_idx = 1 | ref_idx = 0 | ref_idx = 1 |
| Count_00 | Count_01 | Count_10 | Count_11 |

In this stage, since the condition flags have been reset to default, the IC_flag is always present (730) for CU coded in inter mode. In a variant, IC_flag is always present and step (730) is always true for CU coded in inter mode except for merge and skip cases.

Next, the condition flag are set to values that depend (745) on the collected statistics (740). For example, the value of flag_Ri_Rj is set to 0 if count_ij is zero, set to 1 if count_ij is >0.

In the second stage (bitstream coding), for each CU, the IC_flag is coded if the conditions flags indicate IC_flag is present (770), else it is inferred to zero (not coded). For example, if ref_idx[L0]=0 and ref_idx[L1]=0 and flag_R0_R0=0, then IC_flag is not coded. If ref_idx[L0]=0 and ref_idx[L1]=0 and flag_R0_R0=1, then IC_flag is coded.

For the subsequent slices, the statistics collected for previous slice (PS) or previous picture can be used to derive the presence of the "IC_flag" in stage 1 (735). Advantageously one may select PS as the closest (smallest difference of "poc" value with "poc" of current slice) previous slices with hierarchical depth (or temporal id) inferior to the current slice hierarchical depth (or temporal id).

If the number of CUs or samples with IC enabled in PS is inferior to a threshold, then IC_flag is disabled for the current slice at stage 1. In a variant, if the estimated BD-rate gain of enabling IC in PS versus disabling IC in PS is inferior to a threshold, then IC flag is disabled for the current slice at stage 1.

This document describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 8:
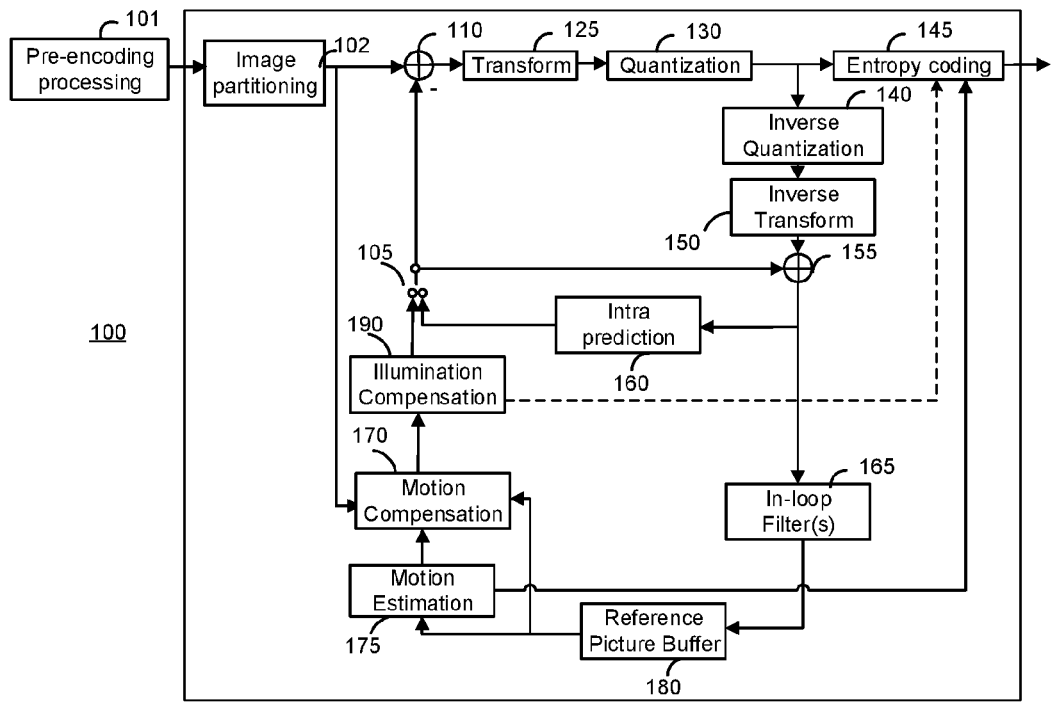
FIG. 8 illustrates a block diagram of an embodiment of a video encoder.
Figure 9:
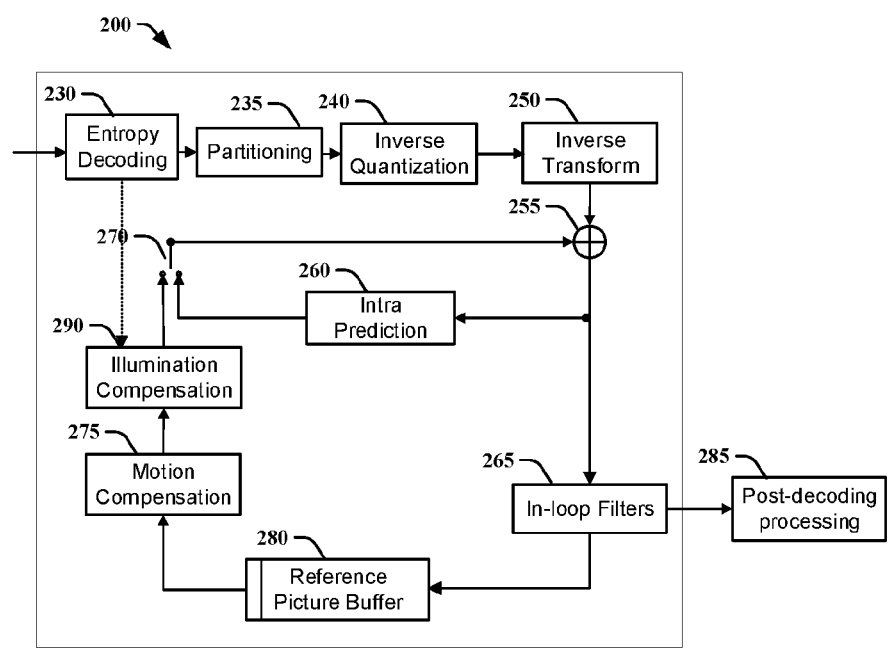
FIG. 9 illustrates a block diagram of an embodiment of a video decoder.
Figure 10:
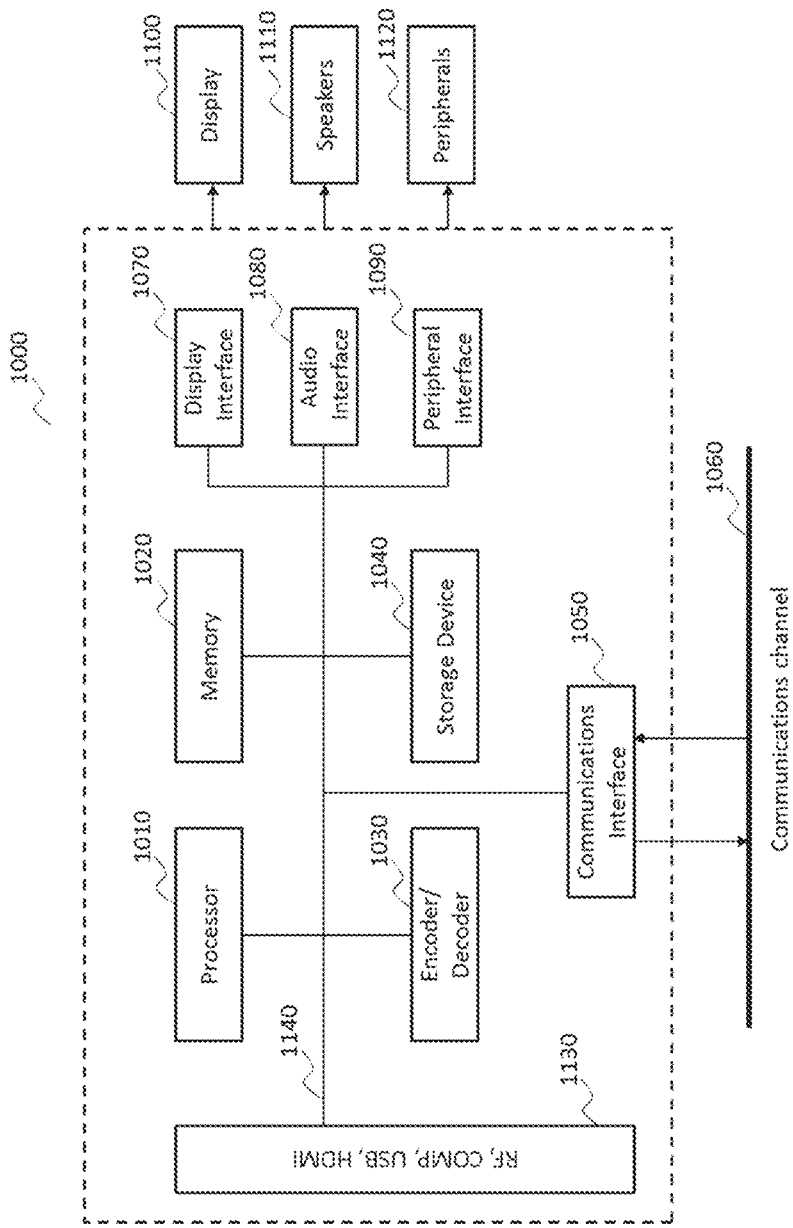
FIG. 10 illustrates a block diagram of a system within which aspects of the present embodiments can be implemented.

The aspects described and contemplated in this document can be implemented in many different forms. FIGS. 8, 9 and 10 below provide some embodiments, but other embodiments are contemplated and the discussion of FIGS. 8, 9 and 10 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this document can be used to modify modules, for example, illumination compensation modules (190, 290), entropy coding, and/or decoding modules (230, 145), of a video encoder 100 and decoder 200 as shown in FIG. 8 and FIG. 9. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this document can be used individually or in combination.

Various numeric values are used in the present document. The specific values are for example purposes and the aspects described are not limited to these specific values.

FIG. 8 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175), motion compensation (170) and illumination compensation (190) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. More specifically, the module 145 is detailed in FIG. 7. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 9 illustrates a block diagram of a video decoder 200. In the decoder 200, a bitstream is decoded by the decoder elements as described below. Video decoder 200 generally performs a decoding pass reciprocal to the encoding pass as described in FIG. 8. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. More specifically, a part of the module 230 is detailed in the FIG. 5A.

The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion and illumination-compensated prediction (i.e., inter prediction) (275, 290). Note that the illumination compensation modules 190 (encoder) and 290 (decoder) are identical. In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 10 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device).

System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements necessary for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the I2C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a Wi-Fi network such as IEEE 802.11. The Wi-Fi signal of these embodiments is received over the communications channel 1060 and the communications interface 1050 which are adapted for Wi-Fi communications. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, decoding a flag indicating whether illumination compensation is applied on a current block depending on a condition, applying illumination compensation depending on the value of the flag.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, encoding a flag indicating whether illumination compensation is applied on a current block depending on a condition, applying illumination compensation depending on the value of the flag.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, for example, IC_flag, ref_idx[ ], flag_Li_Rj, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment.

Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "determining" various pieces of information. Determining the information can include one or more of, for example, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a flag indicating whether illumination compensation is applied on a current block depending on a condition, or a flag indicating whether illumination compensation is enabled. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We have described a number of embodiments. These embodiments provide, at least, for the following generalized inventions and claims, including all combinations, across various different claim categories and types:

Modifying the illumination compensation process applied in the decoder and/or encoder.

Illumination compensation process means the weighting of the prediction "P" based on linear function ("a.P+b" or "a.P") and IC parameters are (a;b) or (a).

Illumination compensation process is applied on a current block depending on a comparison of a block parameter with a value in the decoder and/or encoder.

The value varies on a picture basis.

The value is decoded from the bitstream, e.g. PPS, SPS, slice.

The block parameter is at least one of the block component, reference picture index, the block depth, the hierarchical picture depth.

Decoding (respectively encoding) a flag indicating whether illumination compensation applies for a current block only in the case where a parameter of the current block verifies a given condition.

Decoding (respectively encoding) a flag indicating whether illumination compensation is applied on a current block depending on a comparison according to any of the embodiments discussed.

Applying illumination compensation on a current block depending on the component, e.g. illumination compensation is only applied on luma component.

Decoding a flag indicating whether illumination compensation is applied on a current block in the case where the current block depth is below a value.

Decoding a flag indicating whether illumination compensation is applied on a current block in the case where the hierarchical picture depth is above a value.

Inserting in the signaling syntax elements that enable the decoder to determine whether illumination compensation is applied on a block according to any of the embodiments discussed.

A bitstream or signal that includes one or more of the described syntax elements, or variations thereof.

Inserting in the signaling syntax elements that enable the decoder to adapt illumination compensation in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs illumination compensation according to any of the embodiments described.

A TV, set-top box, cell phone, tablet, or other electronic device that illumination compensation according to any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs illumination compensation according to any of the embodiments described.

A TV, set-top box, cell phone, tablet, or other electronic device that receives (e.g. using an antenna) a signal over the air that includes an encoded image, and performs illumination compensation according to any of the embodiments described.

A method for decoding a current block of a picture is disclosed that comprises: accessing a motion compensated reference block;
  decoding at least one illumination compensation parameter for said current block responsive to a comparison of a parameter of said current block with a value;
  compensating illumination of said motion compensation reference block responsive to said at least one illumination compensation parameter; and
  reconstructing said current block from said illumination and motion compensated reference block.

An apparatus is disclosed that comprises one or more processors configured to perform:
  accessing a motion compensated reference block;
  decoding at least one illumination compensation parameter for a current block of a picture responsive to a comparison of a parameter of said current block with a value;
  compensating illumination of said motion compensation reference block responsive to said at least one illumination compensation parameter; and
  reconstructing said current block from said illumination and motion compensated reference block.

In an embodiment, the at least one illumination compensation parameter is a flag indicating whether illumination compensation applies for said current block.

In an embodiment, the value is decoded from a sequence header, a picture header or a slice header.

In an embodiment, the block parameter is at least one of the block components, reference picture index, the block depth and the hierarchical picture depth.

In an embodiment, decoding at least one illumination compensation parameter for said current block responsive to a comparison of a parameter of said current block with a value comprises decoding a flag indicating whether illumination compensation applies on said current block only in the case where a reference picture index of said current block is equal to a first value.

In an embodiment, decoding at least one illumination compensation parameter for said current block responsive to a comparison of a parameter of said current block with a value comprises decoding a flag indicating whether illumination compensation applies on said current block only in the case where a size of said current block is above a second value In an embodiment, decoding at least one illumination compensation parameter for said current block responsive to a comparison of a parameter of said current block with a value comprises decoding a flag indicating whether illumination compensation applies on said current block only in the case where the current block depth is below third value.

In an embodiment, decoding at least one illumination compensation parameter for said current block responsive to a comparison of a parameter of said current block with a value comprises decoding a flag indicating whether illumination compensation applies on said current block only in the case where hierarchical picture depth is below a fourth value.

In an embodiment, illumination compensation parameter is only decoded for a subset of the components of the current block.

A method for encoding a current block of a picture is disclosed that comprises: accessing a motion compensated reference block;
  encoding at least one illumination compensation parameter for said current block responsive to a comparison of a parameter of said current block with a value;
  compensating illumination of prediction based on said motion compensation reference block responsive to said at least one illumination compensation parameter; and
  encoding said current block from said illumination and motion compensated reference block.

An apparatus is disclosed that comprises one or more processors configured to perform:
  accessing a motion compensated reference block;
  encoding at least one illumination compensation parameter for a current block of a picture responsive to a comparison of a parameter of said current block with a value;
  compensating illumination of prediction based on said motion compensation reference block responsive to said at least one illumination compensation parameter; and
  encoding said current block from said illumination and motion compensated reference block.

In an embodiment, the at least one illumination compensation parameter is a flag indicating whether illumination compensation applies for said current block.

In an embodiment, the value is encoded in a sequence header, a picture header or a slice header.

In an embodiment, the block parameter is at least one of the block components, reference picture index, the block depth and the hierarchical picture depth.

In an embodiment, encoding at least one illumination compensation parameter for said current block responsive to a comparison of a parameter of said current block with a value comprises encoding a flag indicating whether illumination compensation applies on said current block only in the case where a reference picture index of said current block is equal to a first value.

In an embodiment, encoding at least one illumination compensation parameter for said current block responsive to a comparison of a parameter of said current block with a value comprises encoding a flag indicating whether illumination compensation applies on said current block only in the case where a size of said current block is above a second value.

In an embodiment, encoding at least one illumination compensation parameter for said current block responsive to a comparison of a parameter of said current block with a value comprises encoding a flag indicating whether illumination compensation applies on said current block only in the case where the current block depth is below a third value.

In an embodiment, encoding at least one illumination compensation parameter for said current block responsive to a comparison of a parameter of said current block with a value comprises encoding a flag indicating whether illumination compensation applies on said current block only in the case where hierarchical picture depth is below a fourth value.

In an embodiment, illumination compensation parameter is only encoded for a subset of the components of the current block.

Various other generalized, as well as particularized, inventions and claims are also supported and contemplated throughout this disclosure.

The invention claimed is:

1. A method for decoding a current block of a picture of a sequence of pictures representative of a single view from video data, comprising:
accessing a motion compensated reference block from the video data;
obtaining a value of a flag for the current block, the flag indicating whether illumination compensation applies to the current block;
compensating illumination of the motion compensated reference block based on the flag; and
reconstructing the current block from the illumination and motion compensated reference block;
wherein the value of the flag is obtained by reading the flag from the video data responsive to a first information indicating that illumination compensation is enabled at a sequence level, a picture level, or a slice level and responsive to a condition to the presence of the flag is fulfilled by the block, the condition being signaled in the video data by a second information in a sequence header, a picture header, or a slice header.

2. A non-transitory information storage medium storing program code instructions for implementing the method according to claim 1.

3. The method of claim 1, wherein the condition indicates that the flag is read from the video data based on a color component of the block.

4. The method of claim 1, wherein the information is signaled by at least one syntax element indicating which reference index can be used by a block for which the illumination compensation is enabled.

5. The method of claim 4, wherein each at least one syntax element indicates a plurality of reference indexes.

6. The method of claim 1, wherein the condition is based on a size of the current block, a hierarchical depth of the picture comprising the current block, a coding tree depth of the current block, or a number of samples on which illumination compensation is applied in a previous slice different from a slice comprising the current block.

7. A device for decoding a current block of a picture of a sequence of pictures representative of a single view from video data, the device comprising electronic circuitry configured for:
accessing a motion compensated reference block from the video data;
obtaining a value of a flag for the current block, the flag indicating whether illumination compensation applies to the current block;
compensating illumination of the motion compensated reference block based on the flag; and
reconstructing the current block from the illumination and a motion compensated reference block;
wherein the value of the flag is obtained by reading the flag from the video data responsive to a first information indicating that illumination compensation is enabled at a sequence level, a picture level, or a slice level and responsive to a condition to the presence of the flag is fulfilled by the block, the condition being signaled in the video data by a second information in a sequence header, a picture header, or a slice header.

8. The device of claim 7, wherein the condition indicates that the flag is read from the video data based on a color component of the block.

9. The device of claim 7, wherein the information is signaled by at least one syntax element indicating which reference index can be used by a block for which the illumination compensation is enabled.

10. The device of claim 9, wherein each of the at least one syntax element indicates a plurality of reference indexes.

11. The device of claim 7, wherein the condition is based on a size of the current block, a hierarchical depth of the picture comprising the current block, a coding tree depth of the current block, or a number of samples on which illumination compensation is applied in a previous slice different from a slice comprising the current block.

12. A method for encoding a current block of a picture of a sequence of pictures representative of a single view from video data, comprising:
accessing a motion compensated reference block from the video data;
obtaining a value of a flag for the current block, the flag indicating whether illumination compensation applies to the current block;
compensating illumination of the motion compensated reference block based on the flag; and
encoding the current block in the video data from the illumination and motion compensated reference block;
wherein the value of the flag is signaled in the video data responsive to a first information indicating that illumination compensation is enabled at a sequence level, a picture level, or a slice level is signaled in the video data and responsive to a condition to the presence of the flag is fulfilled by the block, the condition being signaled by a second information in the video data in a sequence header, a picture header, or a slice header.

13. The method of claim 12, wherein the condition indicates that the flag is signaled in the video data based on a color component of the block.

14. The method of claim 12, wherein the information is signaled by at least one syntax element indicating which reference index can be used by a block for which the illumination compensation is enabled.

15. The method of claim 14, wherein each at least one syntax element indicates a plurality of reference indexes.

16. The method of claim 12, wherein the condition based on a size of the current block, a hierarchical depth of the picture comprising the current block, a coding tree depth of the current block, or a number of samples on which illumination compensation is applied in a previous slice different from a slice comprising the current block.

17. A non-transitory information storage medium storing program code instructions for implementing the method according to claim 12.

18. A device for encoding a current block of a picture of a sequence of pictures representative of a single view from video data, the device comprising electronic circuitry configured for:
accessing a motion compensated reference block from the video data;

obtaining a value of a flag for the current block, the flag indicating whether illumination compensation applies to the current block;

compensating illumination of the motion compensated reference block based on the flag; and encoding the current block in the video data from the illumination and motion compensated reference block;

wherein the value of the flag is signaled in the video data responsive to a first information indicating that illumination compensation is enabled at a sequence level, a picture level, or a slice level is signaled in the video data and responsive to a condition to the presence of the flag is fulfilled by the block, the condition being signaled by a second information in the video data in a sequence header, a picture header, or a slice header.

19. The device of claim 18, wherein the condition indicates that the flag is signaled in the video data based on a color component of the block.

20. The device of claim 18, wherein the information is signaled by at least one syntax element indicating which reference index can be used by a block for which the illumination compensation is enabled.

21. The device of claim 20, wherein each at least one syntax element indicates a plurality of reference indexes.

22. The device of claim 18, wherein the condition is based on a size of the current block, a hierarchical depth of the picture comprising the current block, a coding tree depth of the current block, or a number of samples on which illumination compensation is applied in a previous slice different from a slice comprising the current block is inferior to a value.

* * * * *